United States Patent
Huester et al.

(10) Patent No.: US 12,156,308 B2
(45) Date of Patent: Nov. 26, 2024

(54) COMPUTER-IMPLEMENTED METHOD FOR CONTROLLING TWO LIGHT MODULES

(71) Applicant: HELLA GmbH & Co. KGaA, Lippstadt (DE)

(72) Inventors: Christian Huester, Salzkotten (DE); Boris Kubitza, Moehnesee-Koerbecke (DE); Martin Pluempe, Paderborn (DE); Udo Venker, Guetersloh (DE); Carsten Wilks, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 196 days.

(21) Appl. No.: 17/842,975

(22) Filed: Jun. 17, 2022

(65) Prior Publication Data
US 2022/0322512 A1 Oct. 6, 2022

Related U.S. Application Data

(63) Continuation of application No. PCT/EP2020/085058, filed on Dec. 8, 2020.

(30) Foreign Application Priority Data

Dec. 19, 2019 (DE) .................. 10 2019 135 270.3

(51) Int. Cl.
H05B 47/105 (2020.01)
B60Q 1/04 (2006.01)

(52) U.S. Cl.
CPC ............. H05B 47/105 (2020.01); B60Q 1/04 (2013.01)

(58) Field of Classification Search
CPC .... H05B 47/105; H05B 47/155; H05B 45/18; B60Q 1/04
See application file for complete search history.

(56) References Cited

U.S. PATENT DOCUMENTS

| 10,237,940 B2 | 3/2019 | Pelz et al. | |
| 10,440,786 B1 * | 10/2019 | Stoegner | H05B 45/52 |
| 2011/0163691 A1 * | 7/2011 | Dunn | H05B 45/18 315/297 |
| 2021/0107399 A1 * | 4/2021 | Kumakura | H05B 47/16 |

FOREIGN PATENT DOCUMENTS

| CN | 108548099 A * | 9/2018 | ............... F21K 9/20 |
| DE | 102008038857 A1 | 10/2009 | |
| DE | 102011083025 A1 | 3/2013 | |
| DE | 102017131229 A1 | 6/2018 | |

OTHER PUBLICATIONS

International Search Report dated Mar. 18, 2021 in corresponding application PCT/EP2020/085058.

* cited by examiner

Primary Examiner — Daniel D Chang
(74) Attorney, Agent, or Firm — Muncy, Geissler, Olds & Lowe, P.C.

(57) ABSTRACT

A computer-implemented method for controlling two light modules, comprising the following steps: supplying a first light module with a first electric power and a second light module with a second electric power; determining a first temperature of the first light module and a second temperature of the second light module; and adjusting the first and second electric power as a function of the first and second temperature.

12 Claims, 3 Drawing Sheets

COMPUTER-IMPLEMENTED METHOD FOR CONTROLLING TWO LIGHT MODULES

This nonprovisional application is a continuation of International Application No. PCT/EP2020/085058, which was filed on Dec. 8, 2020, and which claims priority to German Patent Application No. 10 2019 135 270.3, which was filed in Germany on Dec. 19, 2019, and which are both herein incorporated by reference.

BACKGROUND OF THE INVENTION

Field of the Invention

The present invention relates to relates to a computer-implemented method for controlling two light modules.

Description of the Background Art

In the context of this description, a light module is understood to mean, in particular, a component on which multiple light sources, for example, light-emitting diodes, are arranged. To this end, the light sources can be designed to emit electromagnetic radiation with a wavelength between 380 nm and 780 nm.

In the state of the art, light modules are used in motor vehicle headlights. A headlight usually comprises multiple light modules. DE 10 2017 131 229 A1, which corresponds to US 2018/0184495, discloses a method for controlling light modules as a function of temperatures of individual groups of light-emitting diodes.

SUMMARY OF THE INVENTION

It is therefore an object of the present invention to provide an improved computer-implemented method. In addition, an improved headlight and an improved motor vehicle are also provided.

According to an exemplary embodiment, a first light module is supplied with a first electric power and a second light module with a second electric power. In addition, a first temperature of the first light module and a second temperature of the second light module are determined. The electric powers are then adjusted as a function of the first and second temperature.

Depending on the power, heat is generated by the respective module. Thus, by adjusting the powers, excessive heating of one of the light modules can be prevented by reducing its power. If the power of the other module is increased at the same time, the total power used for light generation remains the same, so that no negative effects result for a user when the light modules are used, for example, as part of a headlight of a motor vehicle.

A sum of the first and second electric power remains unchanged during the adjustment. For example, only the proportions of the two powers in the total power are then changed. Thus, the total brightness of both light modules remains the same.

The first power can be decreased, and the second power can be increased during the adjustment if the first temperature is higher than the second temperature. In addition, the first power can be increased, and the second power can be decreased during the adjustment if the first temperature is lower than the second temperature. In this way, the risk of overheating of the two light modules can be reduced. If one light module becomes warmer than the other, its power is reduced so that less heat is generated.

During the determination of the first temperature, a plurality of first measured temperature values can be measured by the first temperature sensors of the first light module and a plurality of second measured temperature values can be measured by the second temperature sensors of the second light module. In this case, the first temperature is determined using the first measured temperature values. The second temperature is determined using the second measured temperature values. The consideration of multiple measured temperature values is advantageous for a more precise determination of the first and second temperature.

The highest of the first measured temperature values can be used in determining the first temperature. The highest of the second measured temperature values can be used in determining the second temperature. This is particularly advantageous to reduce the risk of overheating of the light modules.

It is possible, for example, that in addition to the respectively highest measured temperature value, other measured temperature values are also taken into account. However, it is also possible that the highest first measured temperature value is determined as the first temperature and that the highest second measured temperature value is determined as the second temperature.

A first average value can be formed from the first measured temperature values and a second average value can be formed from the second measured temperature values. The first temperature can be determined using the first average value and the second temperature can be determined using the second average value.

The respective average value can be used, for example, in combination with the respective highest measured temperature value to determine the respective temperature.

The adjustment of the first and second electric power can occur as a function of a difference between the first temperature and the second temperature.

The adjustment of the first and second electric power can be performed using a sigmoid function. This has proved to be particularly advantageous in practical tests.

The sigmoid function can be a logistic function.

The sigmoid function can be defined by the following formula:

$$sig(t) = \frac{1}{1 + e^{-kt}}.$$

In this case, t is the difference between the first and second temperature and k is an adjustable constant. The constant k can also be referred to as a proportionality factor. The larger the constant k is chosen, the greater the adjustment of the first and second power even at relatively small temperature differences between the two light modules.

Further, k can have the value k=1. This has proved to be advantageous in practical tests. However, it is also possible that k has a value between 0.1 and 5, preferably between 0.5 and 2.

The sigmoid function can be used to calculate a proportion of the second electric power in the sum, said proportion to be adjusted in the adjustment. In the above formula, the proportion of the second electric power can then be equal to sig(t).

Provided also is a headlight that comprises a first light module, a second light module, and a controller. The first light module is designed to illuminate an area. The second light module is designed to illuminate the same area. The controller is designed to execute a method according to the invention. In this case, the first and second electric power can come from one power source. In this case, the controller controls the supplying of the first and second light module with the respective electric power.

The first and second light module can each comprise a plurality of light sources.

Also, a motor vehicle is provided that includes the headlight according to the invention. The headlight is designed to illuminate a roadway in front of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
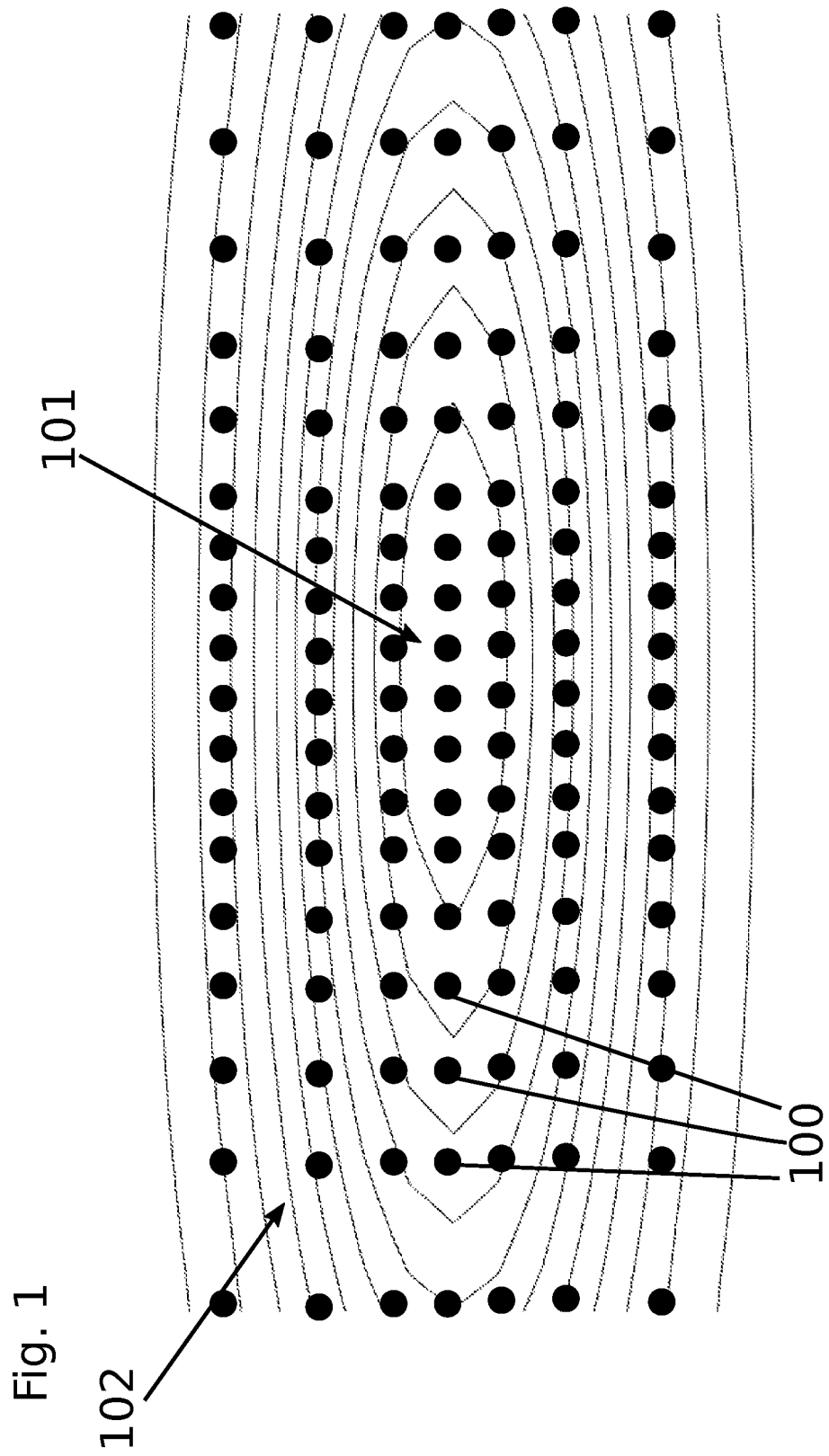
FIG. 1 shows a schematic view of a temperature distribution of a light module with multiple temperature sensors.

A plurality of temperature sensors 100 are disposed on the light module, with each sensor outputting a measured temperature value. Only three of temperature sensors 100 are identified by reference characters. For reasons of clarity, the reference characters have been omitted for the other temperature sensors. During operation of the light module, a higher temperature is usually measured in a central region 101 than in a peripheral region 102.

Figure 2A:
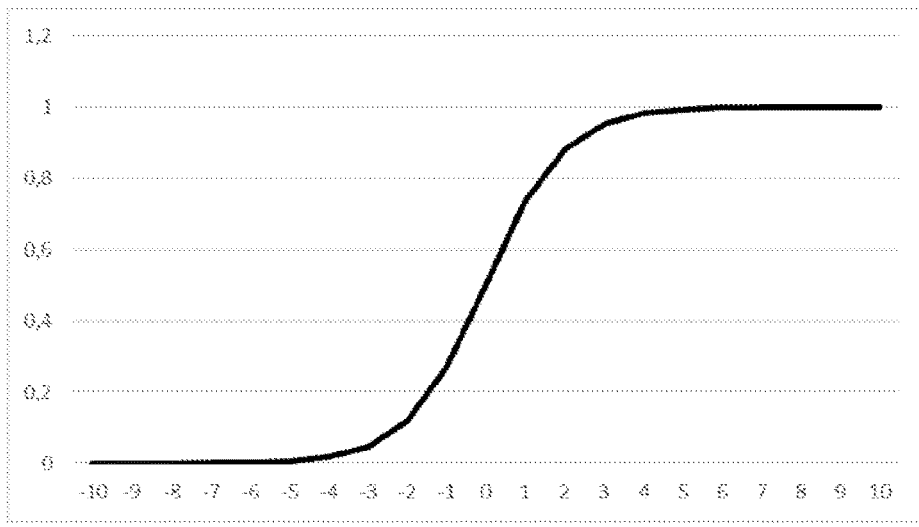
FIGS. 2a to 2c show multiple schematic views of multiple sigmoid functions for use in adjusting the electric power of the light modules.
Figure 2B:
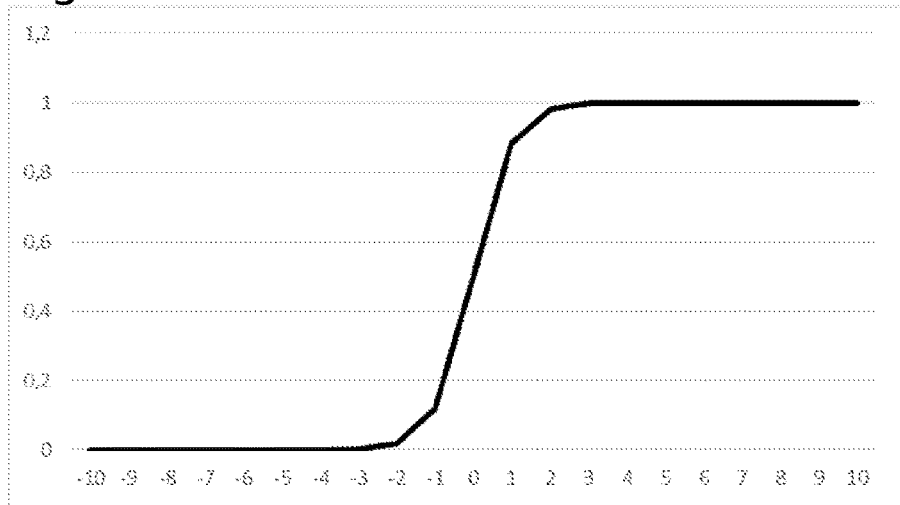
Figure 2C:
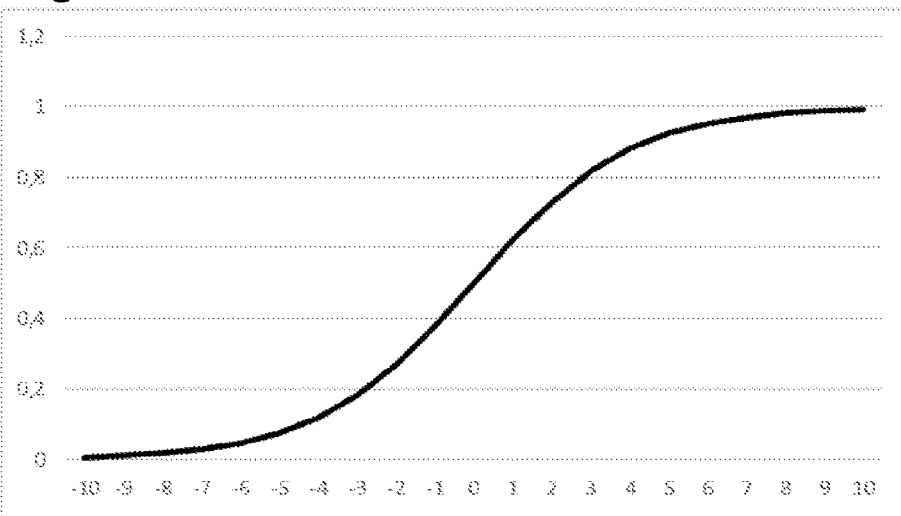

One of the sigmoid functions shown in FIGS. 2A through 2C can be used to determine the power distribution between two light modules. In this case, the sigmoid function of FIG. 2A corresponds to the formula $$sig(t) = \frac{1}{1+e^{-t}},$$

the sigmoid function of FIG. 2B corresponds to the formula $$sig(t) = \frac{1}{1+e^{-2t}},$$

and the sigmoid function of FIG. 2C corresponds to the formula $$sig(t) = \frac{1}{1+e^{-0.5t}}.$$

A difference between a first temperature of the first light module and a second temperature of the second light module is plotted on the x-axis. In the above formulas, t corresponds to this difference. For example, the highest measured temperature value, which was measured by the temperature sensors arranged on the first light module, can be used as the first temperature. For example, the highest measured temperature value, which was measured by the temperature sensors arranged on the second light module, can be used as the second temperature.

Sig(t), which corresponds to the proportion of the second electric power of the second light module in the total power, is plotted on the y-axis, wherein the total power is the sum of the first electric power of the first light module and the second electric power of the second light module.

If there is no difference between the first and second temperature (this is the case at the value 0 on the x-axis), the proportion is 0.5 in all cases. This means that both light modules are operated with the same electric power. If the first temperature is greater than the second temperature (this is the case for positive values on the x-axis), the proportion approaches 1. This means that the second electric power is greater than the first electric power. Thus, the first light module generates less heat and can cool down somewhat. If the second temperature is greater than the first temperature (this is the case for negative values on the x-axis), the proportion approaches 0. This means that the first electric power is greater than the second electric power. Thus, the second light module generates less heat and can cool down somewhat. The sum of the first and second power always remains the same, so that there are no brightness fluctuations for a user.

It can be seen from an overview of FIGS. 2A to 2C that the sigmoid function can be adapted to specific conditions by choosing an appropriate constant in the exponent of Euler's number. The constant can be increased if the power is to be adjusted relatively strongly even at relatively small temperature differences. The constant can be decreased if the adjustment of the power is to be slower.

Figure 3:
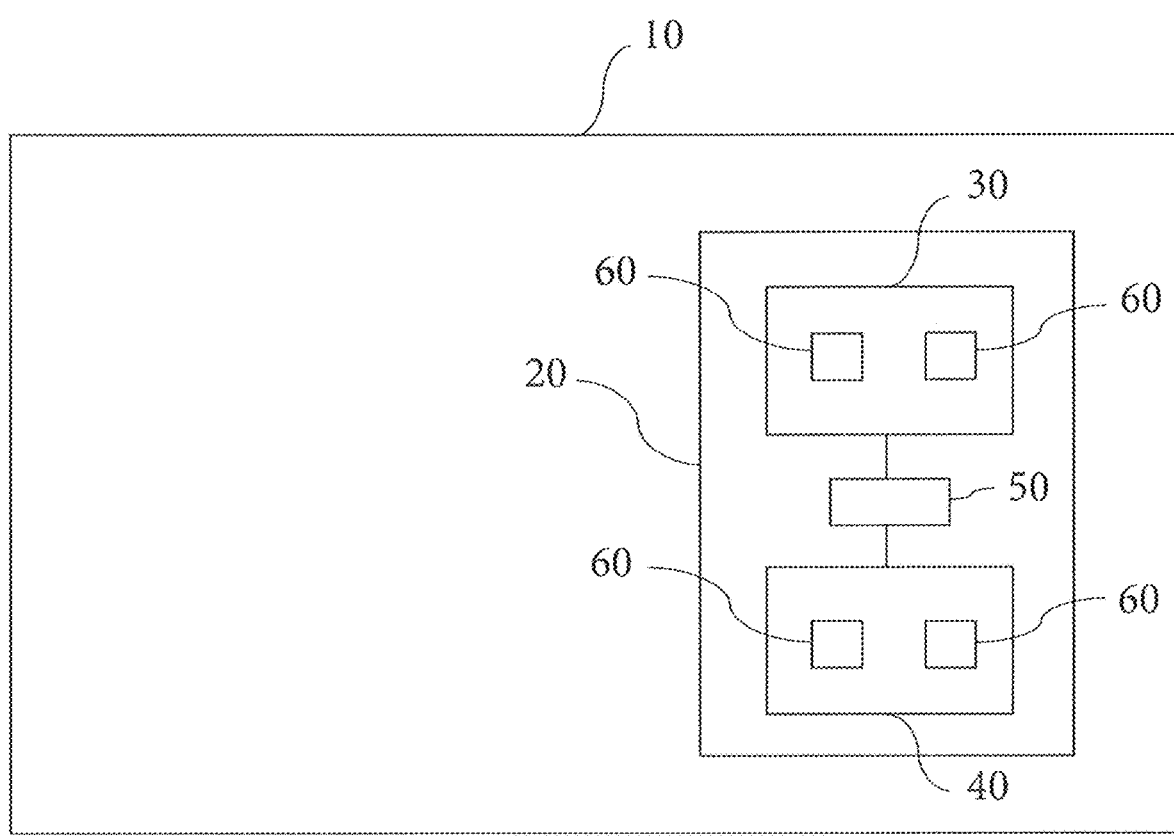
FIG. 3 shows a black box depiction of a vehicle having a headlight with first and second light modules.

FIG. 3 shows a motor vehicle 10 having a headlight 20. The headlight 20 includes a first light module 30 and a second light module 40. Each of the first and second light modules 30, 40 have light sources 60, where only two light sources are shown in each light module for sake of clarity. Furthermore, the headlight 20 includes a controller 50 that executes the method of supplying electric power to the first and second light modules 30, 40, determining temperatures of the first and second light modules 30, 40 and adjusting the electric power of the first and second light modules 30, 40 as a function of the temperatures.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for controlling two light modules, the method comprising:
   supplying a first light module with a first electric power and a second light module with a second electric power;
   determining a first temperature of the first light module and a second temperature of the second light module; and
   adjusting the first and second electric power as a function of the first and second temperature, wherein the adjustment of the first and second electric power occurs as a function of a difference between the first temperature and the second temperature, and wherein the adjustment of the first and second electric power is performed using a sigmoid function, and wherein the sigmoid function is defined by the following formula;

$$sig(t) = \frac{1}{1 + e^{-kt}},$$

where t is the difference between the first and second temperature, and where k is an adjustable constant.

2. The method according to claim 1, wherein a sum of the first and second electric power remains unchanged during the adjustment.

3. The method according to claim 1, wherein the first electric power is decreased and the second electric power is increased during the adjustment, if the first temperature is higher than the second temperature, and in that the first electric power is increased and the second electric power is decreased during the adjustment, if the first temperature is lower than the second temperature.

4. The method according to claim 1, wherein, during the determination of the first temperature, a plurality of first measured temperature values are measured by first temperature sensors of the first light module and a plurality of second measured temperature values are measured by second temperature sensors of the second light module, wherein the first temperature is determined using the first measured temperature values, and wherein the second temperature is determined using the second measured temperature values.

5. The method according to claim 4, wherein a highest value of the first measured temperature values is used in determining the first temperature and wherein a highest value of the second measured temperature values is used in determining the second temperature.

6. The method according to claim 4, wherein a first average value is formed from the first measured temperature values and a second average value is formed from the second measured temperature values, and wherein the first temperature is determined using the first average value and the second temperature is determined using the second average value.

7. The method according to claim 1, wherein the sigmoid function is a logistic function.

8. The method according to claim 1, wherein k=1.

9. The method according to claim 1, wherein the sigmoid function is used to calculate a proportion of the second electric power in a sum of the first and second electric powers, the proportion to be adjusted in the adjustment.

10. A headlight for a motor vehicle, the headlight comprising:

a first light module;

a second light module; and a controller, wherein the first light module is designed to illuminate an area, wherein the second light module is designed to illuminate the same area, and wherein the controller is designed to execute the method according to claim 1.

11. The headlight according to the claim 10, wherein the first and second light module each comprises at least two light sources or a plurality of light sources.

12. A motor vehicle comprising a headlight according to claim 10, wherein the headlight is designed to illuminate a roadway in front of the motor vehicle.

* * * * *